United States Patent
Zaremski et al.

(10) Patent No.: US 8,228,525 B2
(45) Date of Patent: Jul. 24, 2012

(54) RECOVERY FROM OCCURRENCE OF A FAULT CONDITION IN DIGITAL PRINTING

(75) Inventors: Amy Moormann Zaremski, Fairport, NY (US); Dragana Pavlovic, Rochester, NY (US); Bradford Freeman, Penfield, NY (US)

(73) Assignee: Xerox Corporation, Norwalk, CT (US)

( * ) Notice: Subject to any disclaimer, the term of this patent is extended or adjusted under 35 U.S.C. 154(b) by 1120 days.

(21) Appl. No.: 11/879,087

(22) Filed: Jul. 16, 2007

(65) Prior Publication Data
US 2009/0021763 A1    Jan. 22, 2009

(51) Int. Cl.
*G06K 15/00* (2006.01)

(52) U.S. Cl. .................. 358/1.14; 358/1.13; 358/1.15; 271/3.01; 271/278; 271/279; 271/287; 399/361; 399/369; 347/139

(58) Field of Classification Search ............. 358/1.14, 358/1.13, 1.15; 347/139; 271/278, 279, 271/287; 399/361, 369
See application file for complete search history.

(56) References Cited

U.S. PATENT DOCUMENTS

| 5,557,367 | A  | * | 9/1996 | Yang et al. ............... 399/14 |
| 5,845,057 | A  | * | 12/1998 | Takeda et al. ............ 358/1.15 |
| 6,081,341 | A  | * | 6/2000 | Kim ...................... 358/1.14 |
| 6,724,494 | B1 | * | 4/2004 | Danknick ................ 358/1.14 |
| 7,034,951 | B1 | * | 4/2006 | Jones et al. ............. 358/1.12 |
| 7,061,635 | B1 | * | 6/2006 | Wanda et al. ........... 358/1.15 |
| 7,180,619 | B2 | * | 2/2007 | Ferlitsch ................ 358/1.15 |
| 2003/0103236 | A1 | * | 6/2003 | Kato ..................... 358/1.15 |
| 2004/0066527 | A1 | * | 4/2004 | Kloosterman et al. .... 358/1.15 |
| 2004/0126166 | A1 | * | 7/2004 | Miyake ................... 400/74 |
| 2006/0209343 | A1 | * | 9/2006 | Wanda et al. ........... 358/1.15 |
| 2007/0046987 | A1 | * | 3/2007 | Shima ................... 358/1.15 |
| 2007/0133028 | A1 | * | 6/2007 | Ford et al. .............. 358/1.13 |
| 2007/0263235 | A1 | * | 11/2007 | Oomura et al. ........... 358/1.4 |
| 2008/0055626 | A1 | * | 3/2008 | Root et al. .............. 358/1.14 |

* cited by examiner

*Primary Examiner* — Jacky X Zheng
(74) *Attorney, Agent, or Firm* — Fay Sharpe LLP

(57) ABSTRACT

A method of digital printing in which each of the page images of a print job with a large number of sequential pages to be printed is classified as to the job or document type. Upon occurrence of a fault in printing, upon fault clearance and resumption of printing, only those pages having the same classification as the pages involved in the fault are reprinted in sequence from the fault.

1 Claim, 1 Drawing Sheet

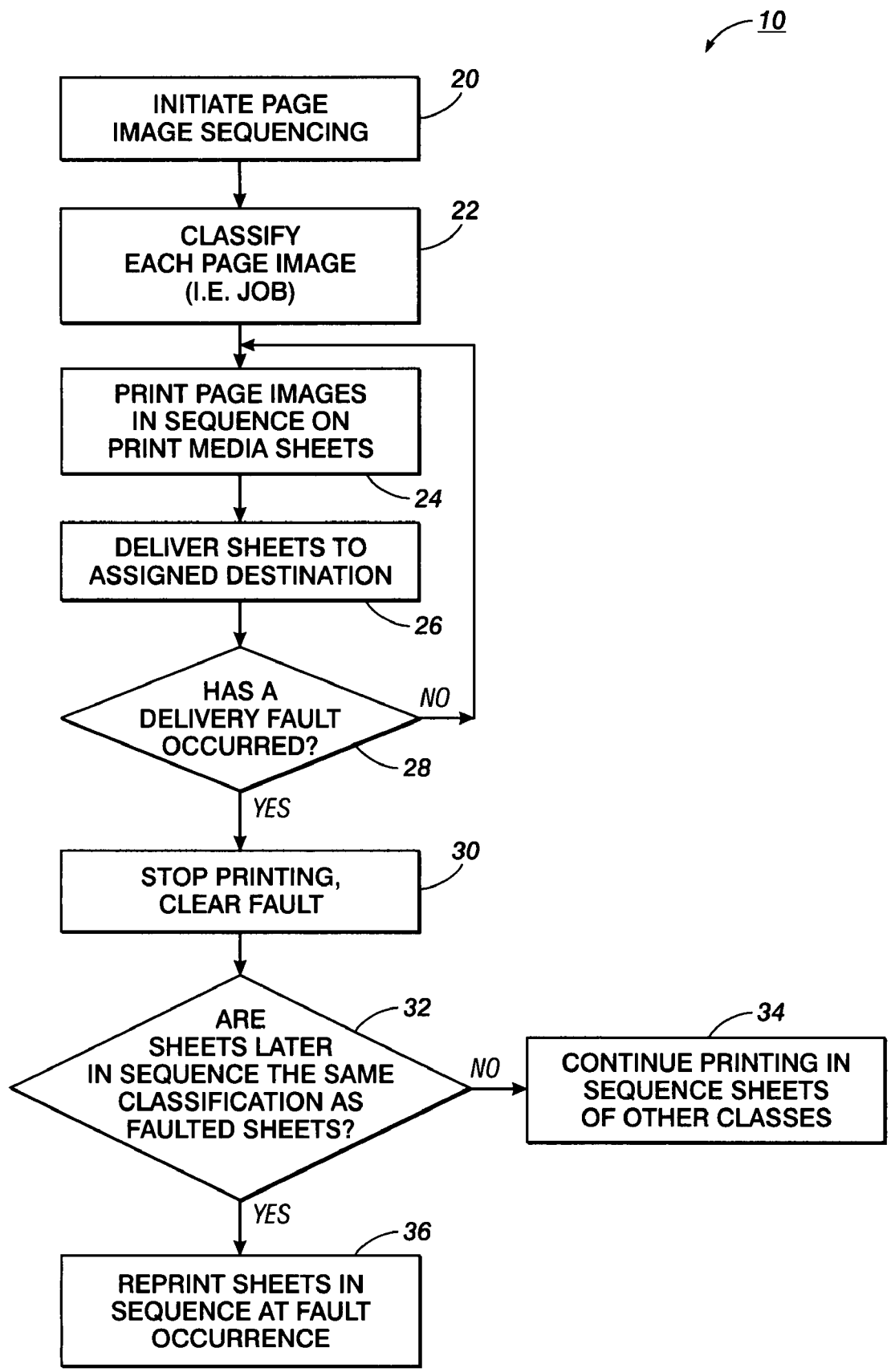

RECOVERY FROM OCCURRENCE OF A FAULT CONDITION IN DIGITAL PRINTING

BACKGROUND

The present disclosure relates to digital printing and particularly relates to printing jobs where it is desired to print documents having consecutively numbered or sequenced pages or sheets and more particularly relates to such printing jobs where delivery of the printed sheets is scheduled for plural destinations. For example, where the print job requires multiple copies of a document having a large number of sequentially numbered pages, it may be necessary to deliver the printed documents to different receptacles or stackers when the initial receptacle or stacker is filled before the print job is complete.

Such printing jobs are commonly encountered where documents with a large number of pages are required in great numbers for mass distribution such as, for example, to a large number of employees or for marketing or advertising purposes.

Digital printing engines have become quite efficient and capable of increased volume and productivity (i.e. printing speed) since the advent of xerographic, ink jet and laser printing. However, these printing engines all require mechanisms capable of handling and transporting individual sheets of print media at relatively high speeds; and, despite the sophistication of the sheet handling mechanisms, often incur a fault condition in the printing process or jamming of the paper during transporting of the paper in the print engine or feeding of the sheets into or out of the print engine.

Where a fault occurrence or jamming occurs during the printing of a document having a large number of sequentially numbered pages, the operator must stop the printing and clear the fault condition before printing can be resumed. Heretofore, when printing was resumed after fault clearance, it was resumed at the page in the numbered sequence where the fault occurred. In many cases, the print engine may have delivered printed sheets having later numbers in the sequence before the fault occurred; and, these later numbered sheets must also be removed and are duplicated upon resumption of the printing after fault clearance. Thus, the duplication of the sheets creates a waste of print media and printing ink which results in a lower overall productivity to the printing process.

Therefore, it has been desired to provide a way or means of eliminating the duplication of sequentially numbered print media sheets upon resumption of printing after a fault clearance in a digital image printing engine.

Furthermore, modern digital printing engines are capable of scheduling the sequencing of different documents for simultaneously printing in the print engine where the pages of the different documents may be interleaved in the output of the print engine to the receptacle or stacker. Thus, although the pages of each of the different documents are sequentially numbered, the finished sheets in the receptacle or stacker may not be sequential for a given document but from one sheet to the next in the stack may be for different documents. Thus, upon occurrence of a fault condition and clearance of the fault some of the sheets in the stack may be delivered after the fault condition but relate to a different document than that involved in the fault condition. Upon resumption of printing after fault clearance, later delivered sheets relating to different document may be unnecessarily discarded. Thus, it has been desired to provide a way of preventing the needless reprinting of pages not out of sequence and not of the same type or class of document upon resumption of printing after fault clearance.

BRIEF DESCRIPTION

The present disclosure addresses the above-described problems and provides a method or process of identifying the type of category or class of each digital page image printed by a digital print engine such that, upon the occurrence of a fault and clearance thereof upon resumption of the clearance of the fault condition, pages out of sequence but not related to the pages involved in the fault condition are not needlessly reprinted. The method of the present disclosure provides for classifying each page of the image digitally in a manner which may be automatically identified; and, in the event of a fault condition and upon clearance of the fault and resumption of printing, only those pages of the same classification as the page involved in the fault are reprinted. The method of the present disclosure thus eliminates needless reprinting of pages not out of sequence with the page involved in the fault and thereby eliminates waste of paper and ink and increases the productivity of the printing process.

BRIEF DESCRIPTION OF THE DRAWINGS

The sole drawing is a flow diagram of the process of the present disclosure.

DETAILED DESCRIPTION

Referring to the sole drawing, a printing system for practicing the method of the present disclosure is indicated generally at 10 and begins at step 20 to initiate the page image sequencing and proceeds to step 22 to classify each page image such as for example as to the type of document or job as for example by adding a flag to each digital page image. The system then proceeds to step 24 and prints the page images in sequence on the print media sheets whereupon the printed sheets are delivered at step 26 in sequence to an assigned destination.

Subsequently, at step 28 the query is made as to whether a delivery fault has occurred; and, if the determination is negative, the system proceeds to step 24 and continues printing. However, if the determination at step 28 is affirmative, printing is ceased and the fault cleared at step 30.

Before printing is resumed, the system proceeds to inquire at step 32 as to whether any sheets later in sequence are of the same classification as the sheets involved in the fault occurrence of step 28. If the determination at step 32 is negative, the printing of the sheets in sequence of other classes is continued at step 34; and, if the determination at step 32 is affirmative the printing is continued and the sheets in sequence from the fault occurrence are reprinted at step 36.

The present disclosure thus describes a method of preventing unnecessary reprinting of sequential pages or sheets in a printing job in the event of a fault occurrence requiring the printing to be stopped and the fault to be cleared. The present method classifies each of the digital page images prior to commencing of printing so that in the event of a fault condition, upon clearance and resumption of printing, only those pages later in the sequence from the fault having the same classification as the fault are reprinted.

It will be appreciated that various of the above-disclosed and other features and functions, or alternatives thereof, may be desirably combined into many other different systems or applications. Also that various presently unforeseen or unanticipated alternatives, modifications, variations or improvements therein may be subsequently made by those skilled in the art which are also intended to be encompassed by the following claims.

The invention claimed is:

1. A method of scheduling sheet delivery of sequential sheets to plural stackers from a single print engine in a digital image printing job comprising:
    (a) scheduling printing of the print job in the print engine in the order of the sequence of the page images;
    (b) assigning print sheet destinations out of the print engine for each sheet to one of the plural stackers and delivering printed sheets in sequence to the assigned stacker;
    (c) in the event of a fault condition in the delivery of the printed sheets, identifying the sheets later in the sequence from the sheet involved in the fault and storing the identity of such later sheets; and,
    (d) clearing the fault condition and reprinting only those of said stored later sheets having the same assigned stacker as the sheets involved in the fault condition and sending the later sheets to the assigned stacker.

* * * * *